United States Patent
Schuessler et al.

(10) Patent No.: US 6,428,758 B1
(45) Date of Patent: Aug. 6, 2002

(54) REFORMATION REACTOR AND OPERATING METHOD

(75) Inventors: Martin Schuessler, Ulm; Detlef Zur Megede, Bubesheim, both of (DE)

(73) Assignee: Xcellsis GmbH, Kirchheim/Tech-Nabern (DE)

(*) Notice: Subject to any disclaimer, the term of this patent is extended or adjusted under 35 U.S.C. 154(b) by 0 days.

(21) Appl. No.: 09/079,387

(22) Filed: May 15, 1998

(30) Foreign Application Priority Data

May 15, 1997 (DE) .......................................... 197 20 294

(51) Int. Cl.[7] .............................. B01J 8/02; B01J 35/02
(52) U.S. Cl. ..................... 422/239; 422/211; 422/198; 48/127.7; 431/7; 431/170; 431/326
(58) Field of Search ................................ 422/198, 211, 422/239; 48/127.7, 198.7; 431/7, 170, 326; 252/373; 159/17.4, 28.6

(56) References Cited

U.S. PATENT DOCUMENTS

| | | | |
|---|---|---|---|
| 3,531,229 A | * 9/1970 | Berglund | 431/262 |
| 3,798,005 A | 3/1974 | Koch | |
| 3,855,372 A | * 12/1974 | Koch | 261/131 |
| 3,930,476 A | * 1/1976 | Koch | 123/545 |
| 4,149,998 A | * 4/1979 | Tauster et al. | 502/328 |
| 4,212,275 A | * 7/1980 | Inoue | 604/366 |
| 5,160,254 A | * 11/1992 | Bell et al. | 431/7 |
| 5,492,878 A | * 2/1996 | Fuji et al. | 502/304 |
| 5,658,449 A | * 8/1997 | Benz et al. | 205/637 |
| 5,810,577 A | * 9/1998 | Ledjeff | 431/170 |
| 5,811,062 A | * 9/1998 | Wegeng et al. | 422/129 |

FOREIGN PATENT DOCUMENTS

| | | |
|---|---|---|
| DE | 19 64 810 | 7/1971 |
| DE | 26 14 673 | 10/1977 |
| DE | 33 45 958 A1 | 6/1984 |
| DE | 37 29 114 C2 | 3/1989 |
| GB | 2 132 108 A | 7/1984 |
| WO | 89/02054 | 3/1989 |
| WO | WO95/07438 | * 3/1995 |

OTHER PUBLICATIONS

Falbe et al., "Römpp Chemie Lexikon", pp. 3587, Date Unknown.
Patent Abstracts of Japan, C–1183, Mar. 25, 1994, vol. 18, No. 176, JP 5–337358 (A), Dec. 21, 1993, Tetsuya Hirata.

* cited by examiner

*Primary Examiner*—Jerry D. Johnson
*Assistant Examiner*—Alexa A. Doroshenk
(74) *Attorney, Agent, or Firm*—Crowell & Moring LLP

(57) ABSTRACT

A reformation reactor, especially suitable for the reformation of methanol, includes a reaction zone in which a reformation catalyst is located and to which a gas mixture to be reformed can be supplied. The reactor includes an evaporator body that adjoins the reaction zone in a flush manner. The evaporator body has a porous, heat-conducting structure for providing the gas mixture to be reformed by mixing and evaporating the gas mixture components supplied to it and for two-dimensionally distributed supply of the gas mixture thus prepared and into the reaction zone. A starting phase can be provided for the operation of the reactor, in which the evaporator body is wetted by a fuel liquid film and, following the addition of oxygen, a flammable mixture results in the reaction zone that is catalytically oxidized. The evaporator body can be heated to operating temperature by the resultant combustion heat, after which a switch can be made to continuous operation of the reformation reactor.

6 Claims, 1 Drawing Sheet

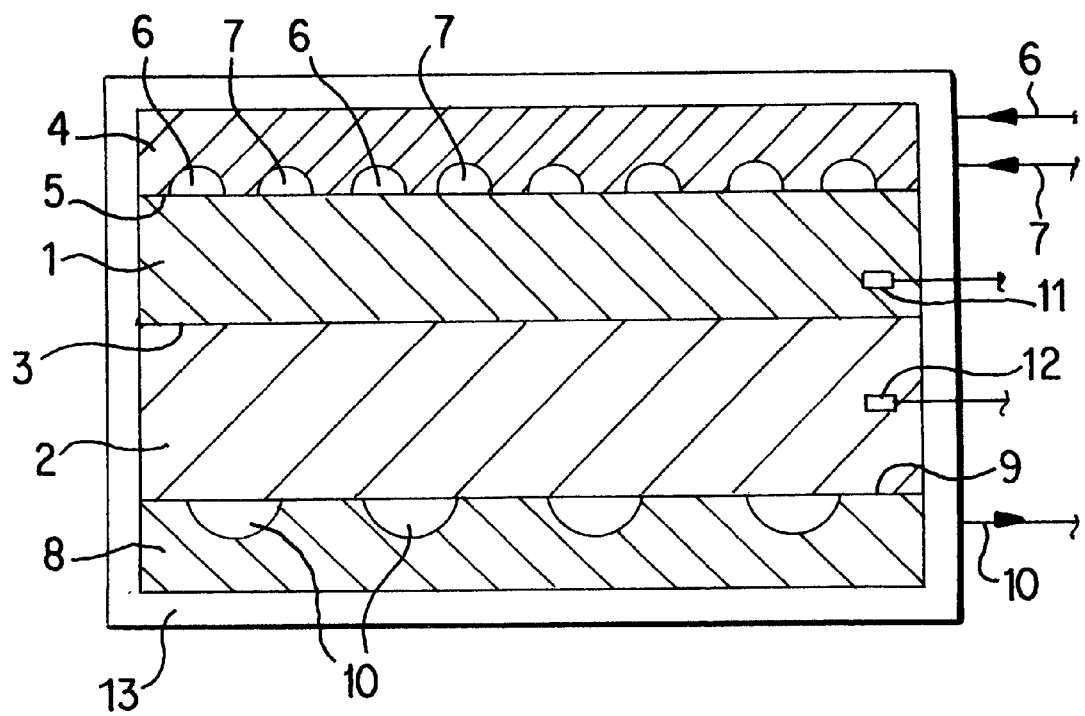

REFORMATION REACTOR AND OPERATING METHOD

This application claims the priority of German Patent document No. 197 20 294.2, filed May 15, 1997, the disclosure of which is expressly incorporated by reference herein.

BACKGROUND AND SUMMARY OF THE INVENTION

The present invention relates to a reformation reactor with a reaction zone in which a reformation catalyst is located and to which a gas mixture containing a hydrocarbon to be reformed can be supplied.

An area of application for reformation reactors that is becoming increasingly significant is motor vehicles operated by fuel cells. Reformation reactors of this type are used to obtain hydrogen from methanol supplied in liquid form in order to obtain the hydrogen required by the fuel cells. Depending on the processing conditions, the methanol can be converted by endothermal steam reformation, exothermal partial oxidation, or, for example, as an autothermal process by a combination of both reactions, into a reformate gas that is rich in hydrogen. For the sake of simplicity, in the present case the term "reformation" will also include the partial oxidation of methanol or another hydrocarbon that is used.

The liquid components that participate in the reformation reaction are evaporated before they enter the reaction zone. Usually this takes place either in a separate evaporator connected upstream of the reactor or in a heated reactor area spatially separated from, and connected upstream of, the reaction zone. The gas mixture components can be added to this evaporator area by ultrasonic atomization, for example. Another conventional method consists in the complete combustion of a liquid hydrocarbon and evaporation of the fuel or water added later by the hot combustion products. The problems with this conventional method consist primarily of the inexact monitoring of the evaporation process, which can lead to incomplete evaporation, in other words the formation of drops, pulsations, a high pressure drop, and high heat losses in the case of indirect heating as well as sluggish dynamics. These defects are not advantageous, for example, in the area of application to motor vehicles that operate by fuel cells. For reasons related to space requirements and because all the load changes typical of motor vehicle operation are rapid and frequent, a reactor type is desirable that has a compact design and reacts rapidly to load changes.

U.S. Pat. No. 3,798,005 discloses a reactor for producing a hydrogen-rich gas by catalytic oxidation, preferably of long-chain hydrocarbons such as $C_6H_{14}$ and $C_8H_{18}$. The reactor consists of at least two sintered blocks located in series with a space between them, to which blocks a suitable catalyst material is added. At least the sintered block containing the catalyst and located first in the flow direction is designed for catalytic oxidation of the hydrocarbon, while at least the last sintered block in the flow direction is designed as a shift stage for converting carbon monoxide into carbon dioxide. Catalytic oxidation of the hydrocarbon typically takes place at relatively high temperatures between 900° C. and 1650° C. while the $CO$—$CO_2$ conversion reaction takes place at temperatures between approximately 150° C. and 5000° C. The water required for the $CO$—$CO_2$ conversion reaction is injected as steam into the space in front of each shift stage sintered block. In front of the first sintered block in the flow direction that contains the catalyst, there is a mixing chamber into which the hydrocarbon to be reacted is added through an injection line and an air stream is added through a catalyst-free sintered block on the inlet side. The quantity of oxygen in the air stream is adjusted so that the subsequent catalytic oxidation takes place as incomplete flame-free combustion. The air stream is supplied in a countercurrent on the outside of a reactor jacket and is preheated by the heat given off. A pipe complex located on the outlet side in the reactor and consequently subjected to the flow of reaction gas that is still hot is used to preheat the hydrocarbon to be reacted and the water that is injected.

Offenlegungsschrift DE 33 45 958 A1 discloses a methanol reformation reactor for producing hydrogen in a fuel-cell-operated motor vehicle and an operating method therefor in which a special starting phase is provided before subsequent continuous operation. In this starting phase, liquid methanol is burned in a combustion chamber of the reactor that is separate from a reformation reaction zone. The hot combustion gas flows through a combustion gas chamber that is in a heat-conducting connection through a heat-conducting wall with the reformation reaction zone and as a result indirectly heats the catalyst material located therein. In addition, the combustion gas, after passing through the combustion gas chamber, is recycled through the reformation reaction zone, thus also heating the catalyst directly. When the reaction zone has reached its operating temperature, in this manner, methanol combustion is terminated and a hot-gas valve is switched to remove the combustion gas from the system, while during continuous operation that then begins, a methanol/steam mixture is added to the reaction zone for steam reformation of the methanol. A burner that serves to maintain the heating of the reaction zone during continuous operation of the reactor is operated on the surplus hydrogen from the fuel cells.

A reformation reactor with a plate design is disclosed in Offenlegungsschrift JP 5-337358 (A) in which a distribution chamber is laminated to a combustion chamber with interposition of a fuel distributing plate. The distributing plate is provided with a large number of distributing openings. A fuel/air mixture is burned in the combustion chamber. The air is fed directly into the combustion chamber through a matching air feed line, while the fuel enters the distribution chamber through a matching fuel supply opening and travels from there through the openings in the distributing plate into the combustion chamber. In order to prevent backflow from the combustion chamber into the distributing chamber, a portion of the airflow can be supplied to the fuel feed line through a branch line with a controllable valve and premixed therein with the supplied fuel.

Patent DE 37 29 114 C2 discloses a catalytic oxidation reactor for ignitable gas mixtures, in which a gas-permeable first layer containing a suitable oxidation catalyst is contained in a reaction chamber connected with a cooling medium and provided on a side facing the supplied gas mixture with a gas-permeable second layer. On its side opposite the second layer, the first layer is covered by a third layer that is impermeable to gas and liquid and is in thermal contact with the cooling medium. The gas mixture to be reacted passes through the second layer into the first layer where the oxidation reaction takes place under the influence of the catalyst. The resultant reaction components, for example steam in the case of an oxygen/hydrogen conversion, are then brought out from the first layer in a countercurrent through the second layer and then discharged. The second, preferably porous, layer functions as a diffusion blocking layer that allows only a metered predetermined gas mixture quantity to reach the first layer and is composed of a material that is a poor conductor of heat so that heat removal takes place primarily through the third layer to the cooling medium.

The technical problem solved by the present invention is the provision of a reformation reactor and an operating method therefor for reforming a hydrocarbon-containing gas mixture that is especially suited for applications in which a compact reactor design and high reactor dynamics are required, especially for mobile applications, such as fuel-cell-operated motor vehicles. For the sake of simplicity, the term "hydrocarbon" will be used to refer to hydrocarbon derivatives as well, such as methanol.

The present invention achieves this goal by providing a reformation reactor comprising (1) a reaction zone in which a reformation catalyst is located and to which a hydrocarbon-containing gas mixture to be reformed can be supplied; and (2) an evaporator body that is flush and adjacent to reaction zone, wherein the evaporator body has a porous, heat-conducting structure for preparing the gas mixture by mixing and evaporating gas mixture components supplied in liquid form, and for two-dimensionally feeding the prepared gas mixture into the reaction zone through a corresponding evaporator body and reaction zone interface. The present invention also achieves this goal by providing an operating method comprising adding, in a starting phase, an oxidizable material containing a hydrocarbon as a liquid film to an evaporator body to wet its porous structure; adding a gas containing oxygen; catalytically oxidizing a part of the oxidizable material that makes the transition to the gas phase in the reaction zone, thereby releasing heat that is conducted into the evaporator body; and after an operating temperature of the evaporator body is reached, during a starting phase, supplying components to the evaporator body to prepare the gas mixture to be reformed; and feeding the gas mixture into the reaction zone.

The reactor according to the present invention includes an evaporator body that abuts the reaction zone two-dimensionally. The evaporator body is designed with a porous heat-conducting structure such that it is able to mix and evaporate the components of the gas mixture to be reformed that are supplied to it and to supply them as a homogeneous evaporated mixture distributed two-dimensionally via the interface into the reaction zone. As a result of this integration of the evaporator into the reactor, an especially compact reactor design is possible. As a result of the heat-conducting design of the evaporator body structure, in cases in which an exothermal reaction is taking place in an adjoining area of the reaction zone, surplus heat can be added very effectively and uniformly transported to the evaporator body from the reaction zone by solid-body conduction, and can be used therein for the evaporation process. This heat transport through solid-body conduction is much more effective than heat transport via the gas phase. Since the evaporator body directly abuts the reformation reaction zone and the gas mixture to be reformed is fed homogeneously and two-dimensionally into the reaction zone, very short heat transport pathways result, together with low heat capacities and good spatial homogeneity of the reaction products, so that the reactor has comparatively high dynamics and is thus able to react very rapidly to load changes.

In another embodiment of the present invention, the reaction zone is formed by a reaction body having a porous, heat-conducting structure that is connected with the evaporator body in such a way that the solid bodies conduct heat, and incorporates the reformation catalyst as a surface layer. This surface layer can be much thinner by comparison with the typical diameters of the pellets in conventional catalyst charges. Thus, there is no overheating of the catalyst material and the entire catalyst mass can be used for the reformation reaction, since the gas mixture to be reformed can penetrate by diffusion into the entire, relatively limited depth of the layer. Advantageously, the reaction body can form an integral, porous, heat-conducting structure with the evaporator body, in which only the part that forms the reaction body is provided with the catalyst layer.

In another embodiment of the reactor according to the present invention, a special guide plate is provided by which the components of the gas mixture to be reformed can be supplied, relatively uniformly distributed, to an inlet area of the evaporator body, reinforcing the mixing function of the evaporator body.

In the operating method according to the present invention, a special starting phase is provided for the reformation reactor, in which an oxidizable, hydrocarbon-containing material is added to the evaporator body as a liquid film that wets the porous structure and a gas containing oxygen is added in such fashion that the part of the hydrocarbon-containing material that changes to the gas phase travels from the evaporator body into the reaction zone and is burned catalytically there, with oxidation taking place two-dimensionally on the basis of the special reactor design, thereby avoiding "hot spots" and hence triggering of a homogeneous combustion that is no longer flame-free. If necessary, this combustion process can also be continued during the continuous operation that follows. The combustion heat produced in the reaction zone is transported very effectively by solid-body conduction into the evaporator body and results in accelerated evaporation of the material containing the hydrocarbon added there in liquid form. As soon as the evaporator body has reached a certain temperature at which the components of the gas mixture to be reformed can evaporate, the components are added to the evaporator body in such fashion that their complete evaporation is ensured and a monitored temperature increase as well as a uniform temperature distribution take place. This is achieved preferably by a monitored increase in the admixture of the gas mixture to be reformed and/or by a controlled addition of water and/or a suitable control of the fuel/air ratio for the catalytic combustion. During subsequent continuous operation, the liquid and gaseous components of the gas mixture to be reformed, for example, liquid or already completely or partially gaseous methanol and water as well as possibly a gas containing oxygen, such as air, are introduced into the evaporator body.

In another embodiment of the operating method according to the present invention, the reaction conditions during continuous operation of the reactor are adjusted so that in the reaction zone, at least in an area adjoining the evaporator body, an exothermal reaction takes place, for example a partial oxidation of methanol. The reaction heat can be added very effectively to the evaporator body by solid-body heat conduction, and provides the necessary heat to prepare the gas mixture to be reformed, especially for evaporating and/or overheating the mixture components involved which may be liquid. Maintaining these reaction conditions ensures optimal evaporation under all operating states and therefore also a very good dynamic behavior during load changes.

Other objects, advantages and novel features of the present invention will become apparent from the following detailed description of the invention when considered in conjunction with the accompanying drawing.

BRIEF DESCRIPTION OF THE DRAWINGS

The single FIGURE shows a schematic lengthwise section through a reactor suitable for steam reformation of methanol, for example.

DETAILED DESCRIPTION OF PREFERRED EMBODIMENTS

The reactor shown in the figure can be used, for example, for steam reformation of methanol in a motor vehicle operated by fuel cells in order to generate the hydrogen required for the fuel cells from methanol supplied in liquid form. The reactor, structured in layers, has an evaporator body in the form of an evaporator layer 1 formed by a porous, metallic, and hence good heat-conducting matrix. The porous evaporator layer 1 produces only a relatively slight pressure drop and is permanently connected on one wide side with a catalyst layer 2 that serves as the reformation reaction zone. Catalyst layer 2 is also formed by a porous metallic matrix, with evaporator layer 1 and catalyst layer 2 being possibly formed by a single continuous porous matrix. Therefore, there is a correspondingly large area of the corresponding interface 3 through which the gas mixture prepared in evaporator layer 1 and to be reformed is allowed to enter uniformly distributed in two dimensions into catalyst layer 2, in other words into the reaction zone. The porous evaporator layer 1 produces a turbulent flow of the gas mixture components upstream from the area occupied by the catalyst material (i.e., catalyst layer 2) causing their concentration to increase upstream from the reaction-active points so that a small area of reduction at most results. Catalyst layer matrix 2 is occupied by a surface layer, thin by comparison with the typical diameters of conventional pellets of catalyst filling, of a conventional material that catalyzes steam reformation of methanol. Because of the large surface area of the porous catalyst layer of matrix 2, a large effective catalyst area results that is also reliably protected against overheating effects because of its relatively limited thickness and can be used throughout its entire depth for the reformation reaction by the diffusion of the gas mixture to be reformed.

To produce the gas mixture to be reformed, the liquid and/or gaseous components are conducted by a feed plate of an inlet area 5 to evaporator layer 1. The feed plate is formed by its wide side opposite the evaporator layer-catalyst layer interface 3. Feed plate 4 has two separate feed channel structures 6, 7 of which one serves to supply the liquid components and the other serves to supply the gaseous components. Thus, for steam reformation of methanol, a liquid methanol/water mixture can be supplied through one channel structure 6 and air or another oxygen-containing gas stream can be supplied through the other channel structure 7. Advantageously, channel structures 6, 7 that supply the materials can be designed with channels that are open to inlet area 5 of evaporator layer 1. The two channel structures 6, 7 form a row of elongate channel branches in the plane of inlet area 5 of evaporator layer 1 in such fashion that the channel branches of the two channel structures 6, 7 follow one another alternately. As a result, the various gas mixture components, already relatively uniformly distributed over inlet area 5, can be added to evaporator layer 1.

Supplying the educts does not necessarily have to be performed separately in this manner in separate channels. In another embodiment of the invention, it is also possible to use a common distribution system for all educts. Liquid educts can, for example, be added as tiny droplets of a spray or mist with the gas stream.

Wide side 9 of catalyst layer 2 that is located opposite interface 3 of the evaporator layer and catalyst layer and functions as an outlet adjoins an outlet plate 8 that is provided with an outlet channel structure that is open on the side facing catalyst layer-outlet area 9, through which the reacted reformate gas is collected on the outlet side of catalyst layer 2 and removed from the reactor by channel structure 10. In both evaporator layer 1 and catalyst layer 2, temperature sensors 11, 12 are provided, with more temperature sensors being provided, depending on the requirement, in these layers 1, 2 and/or in the adjacent plates 4,8. A reactor housing 13 encloses the reactor structure described, as an outer skin.

In a preferred operating method for the reactor shown, a distinction is made between a starting phase with the reactor not yet having reached operating temperature and continuous operation. During this starting phase, liquid fuel is initially added to evaporator layer 1 in such fashion that it forms a liquid film that wets the porous structure. This fuel can be the same hydrocarbon as the one that is reformed during subsequent continuous operation, methanol for example, or a different hydrocarbon. As a result of subsequent addition of oxygen or an oxygen-containing gas, even at room temperature, a gas stream or at least a part thereof that depends on the vapor pressure of the hydrocarbon reaches the evaporator layer-catalyst layer interface 3, and an ignitable gas mixture rapidly forms. Following ignition of the mixture by the catalyst of catalyst layer 2, the hydrocarbon, which is in the gas phase, is completely oxidized catalytically. Because of the two-dimensional introduction of the gas mixture into catalyst layer 2, this catalytic combustion takes place without the development of "hot spots" and without triggering homogeneous combustion. The resultant heat of combustion is conducted very effectively into evaporator layer 1 through the solid-body heat-conducting contact between evaporator layer 1 and catalyst layer 2. As a result, the evaporator layer is heated, so that more fuel from the liquid film is evaporated at this point and reaches catalyst layer 2 for catalytic combustion. The cold start effected in this manner can take place within a few seconds. The gas mixture components are very well mixed in the porous matrix of evaporator layer 1, with the liquid components evaporating on the matrix surface as well. Because of the large thermal-contact area and a large contact area with the gas phase, evaporation takes place very dynamically and without pulsations and without drop formation taking place because of wetting. The good cold starting ability is further supported by the fact that all contact between the catalyst material and fuel drops is avoided.

As soon as evaporator layer 1 has reached a certain temperature in this manner that is sufficient for complete evaporation of the liquid components for the subsequent reformation reaction, the components of the gas mixture to be reformed are added with controlled dosage so that a controlled temperature increase and a uniform temperature distribution take place, avoiding "hot spots" due to a uniform temperature distribution. This is also achieved by the controlled addition of water. In addition to the methanol/water mixture conducted through channel structure 6 into evaporator layer 1, during the reformation of methanol, a gas stream containing oxygen is also preferably conducted through the other channel structures 7 into evaporator layer 1 during the continuous operation that begins following the end of the starting phase. During continuous operation, the liquid methanol/water mixture or the same mixture already rendered at least partially gaseous by using the exhaust heat from this or other reactors in the gas generation system and the gas stream containing oxygen are conducted two-dimensionally into evaporator layer 1 and uniformly distributed, mixed, and evaporated in its porous structure. The gas mixture thus prepared passes through the corresponding interface 3 into catalyst layer 2, where it is converted into a hydrogen-rich gas mixture, both by exothermal partial oxidation and by endothermal steam reformation of methanol.

In general, the reaction process during continuous operation is adjusted exothermally in such fashion that the reaction heat that is left over in the total balance is just sufficient for complete evaporation and preheating of the gas mixture components added to evaporator layer 1. Under these conditions, optimum evaporation is achieved in all operating states, in other words, at any load state. This makes it possible, together with the compact reactor design and the resultant short heat transport pathways, the low heat capacities, and the good spatial homogeneity of the gas mixture added two-dimensionally to the catalyst layer and the reformate gas that results from it, to achieve very good reactor dynamics with a short reaction time during load changes. Depending on the application, the reaction process can also be adjusted so that more reaction heat results that can be used for example in the downstream components of the reactor system, for example, for pre-evaporation of the methanol/water mixture, which then, during steady-state reactor operation, enters evaporator layer 1 in evaporated form and mixes there with the gas stream containing oxygen and is then conducted, distributed two-dimensionally, into catalyst layer 2.

If necessary, for further acceleration of the cold-starting process in the inlet-side area of evaporator layer 1, preheating can be integrated that is not shown. With electrical preheating, the corresponding evaporator layer area can be heated with a high electrical power before the addition of the components of the gas mixture to be reformed. Of course, preheating can also be used during continuous operation if required.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reformation reactor, consisting of:
   a reaction body and a catalyst for reforming a hydrocarbon-containing gas mixture;
   a porous, heat-conducting evaporator body that is connected to the reaction body, for mixing and evaporating liquid components or at least partially gaseous components;
   a feed plate located at an inlet area of the evaporator body, wherein the feed plate has at least one feed channel for the liquid components or at least partially gaseous components; and
   an outlet plate located at an outlet area of the reaction body and having at least one outlet channel,
   wherein the reaction body is connected with the evaporator body by a two-dimensional, heat-conducting interface for transferring heat from the reaction body into the evaporator body.

2. The reformation reactor according to claim 1, wherein the reaction body has a porous, heat-conducting structure and wherein the catalyst is in the form of a surface layer.

3. The reformation reaction according to claim 1, wherein the hydrocarbon-containing gas mixture comprises methanol.

4. The reformation reactor according to claim 1, wherein the feed plate has a plurality of channel branches distributed over an inlet surface of the evaporator body.

5. A reformation reactor, consisting of:
   a reaction body and a reformation catalyst for reforming a hydrocarbon-containing gas mixture; and
   a porous, heat-conducting evaporator body for mixing and evaporating liquid components or at least partially gaseous components, wherein the evaporator body abuts the reaction zone via a two-dimensional, heat-conducting interface for transferring heat from the reaction body into the evaporator body.

6. A reformation reactor according to claim 5, wherein the reformation catalyst and the evaporator body form a continuous porous matrix.

\* \* \* \* \*